United States Patent
Trajkovic et al.

(10) Patent No.: US 11,818,808 B2
(45) Date of Patent: Nov. 14, 2023

(54) REDUNDANT DISTRIBUTED ANTENNA SYSTEM (DAS) WITH FAILOVER CAPABILITY

(71) Applicant: DALI SYSTEMS CO. LTD., George Town (KY)

(72) Inventors: Sasa Trajkovic, St. Catharines (CA); Andrew Leung, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 0 days.

(21) Appl. No.: 17/162,772

(22) Filed: Jan. 29, 2021

(65) Prior Publication Data
US 2022/0248498 A1    Aug. 4, 2022

(51) Int. Cl.
*H04W 88/00* (2009.01)
*H04W 88/08* (2009.01)
(Continued)

(52) U.S. Cl.
CPC .......... *H04W 88/085* (2013.01); *H04B 7/022* (2013.01); *H04B 10/25753* (2013.01)

(58) Field of Classification Search
CPC .......... H04B 7/022; H04B 7/26; H04B 10/25; H04B 10/2575; H04B 10/25753; H04B 10/25754; H04B 10/25755; H04B 10/25756; H04B 10/25758; H04B 10/27; H04B 10/272; H04J 14/0291; H04L 12/26; H04L 12/703; H04L 12/721; H04L 12/727; H04L 12/729; H04L 12/735;
(Continued)

(56) References Cited

U.S. PATENT DOCUMENTS

| 4,980,681 A | 12/1990 | Noel |
| 10,404,329 B2 * | 9/2019 | Zhuang .................. H04B 7/024 |

(Continued)

FOREIGN PATENT DOCUMENTS

| CN | 1036999436 A | 8/2014 |
| CN | 104081795 A | 10/2014 |

(Continued)

OTHER PUBLICATIONS

Hejazi, Seyed Amin et al. "A Self-Organized Network for Load Balancing Using Intelligent Distributed Antenna System [4pt]Un réseau auto-organisé pour l'équilibrage de charge utilisant un système intelligent d'antennes distribuées" Canadian Journal of Electrical and Computer Engineering/Revue Canadienne De Genie Electrique and Informatique, Engineering, USA; vol. 38, No. 2; Apr. 1, 2015, pp. 89-99; XP011579918.

(Continued)

*Primary Examiner* — Frank Duong

(57) ABSTRACT

One exemplary aspect generally relates to public safety communication systems employing Distributed Antenna Systems (DAS) and/or a Digital Distribution System (DDS) as part of a distributed wireless network. More specifically, one aspect relates to a DAS/DDS architecture utilizing a software (re)configurable network. Even more specifically, one aspect relates to a DAS/DDS architecture having a redundant system topology as well as failover capabilities at one or more of the hardware/software level and/or the communication link level.

15 Claims, 11 Drawing Sheets

(51) Int. Cl.
*H04B 7/022* (2017.01)
*H04B 10/2575* (2013.01)

(58) Field of Classification Search
CPC ... H04L 45/121; H04L 45/124; H04L 45/125; H04L 45/128; H04L 45/28; H04L 47/20; H04Q 3/00; H04Q 3/0075; H04Q 3/0087; H04Q 2213/167; H04W 88/08; H04W 88/085; Y10S 439/916; Y10S 707/966; Y10S 707/9994
See application file for complete search history.

(56) References Cited

U.S. PATENT DOCUMENTS

| | | | |
|---|---|---|---|
| 10,506,454 B2 * | 12/2019 | Stapleton | H04W 24/02 |
| 10,644,798 B2 | 5/2020 | Trajkovic et al. | |
| 2006/0094470 A1 | 5/2006 | Wake et al. | |
| 2008/0181171 A1 | 7/2008 | Koziy et al. | |
| 2010/0093391 A1 | 4/2010 | Saban et al. | |
| 2012/0039254 A1 | 2/2012 | Stapleton et al. | |
| 2013/0337750 A1 | 12/2013 | Ko | |
| 2014/0072299 A1 | 3/2014 | Stapleton et al. | |
| 2014/0162713 A1 | 6/2014 | Stapleton et al. | |
| 2014/0169264 A1 | 6/2014 | Katori | |
| 2014/0242999 A1 | 8/2014 | Goshen et al. | |
| 2015/0256358 A1 | 9/2015 | Stapleton et al. | |
| 2015/0304044 A1 * | 10/2015 | Stapleton | H04W 52/245 398/115 |
| 2016/0014782 A1 * | 1/2016 | Stapleton | H04W 72/04 370/329 |
| 2016/0242044 A1 | 8/2016 | Han | |
| 2017/0366268 A1 * | 12/2017 | Trajkovic | H04Q 11/0067 |
| 2019/0082243 A1 * | 3/2019 | Stapleton | H04B 10/25753 |
| 2020/0008128 A1 | 1/2020 | Lewis | |
| 2020/0092787 A1 | 3/2020 | Stapleton et al. | |
| 2020/0107204 A1 | 4/2020 | Barabell et al. | |
| 2020/0137694 A1 * | 4/2020 | Stapleton | H04W 40/02 |
| 2020/0295833 A1 | 9/2020 | Trajkovic et al. | |

FOREIGN PATENT DOCUMENTS

| | | |
|---|---|---|
| CN | 104221293 A | 12/2014 |
| JP | 2013-541875 A | 11/2013 |
| JP | 2014-121054 A | 6/2014 |
| WO | WO 2006/135697 | 12/2006 |
| WO | 2012/024345 A2 | 2/2012 |
| WO | 2012/024369 A1 | 2/2012 |
| WO | 2022/165265 A1 | 8/2022 |

OTHER PUBLICATIONS

Invitation to Pay Additional Fees and, Where Applicable, Protest Fee for International Application No. PCT/US2017/032523, dated Jul. 5, 2017.
International Search Report for International Application No. PCT/US2017/032523, dated Sep. 13, 2017.
Written Opinion for International Application No. PCT/US2017/032523, dated Sep. 13, 2017.
International Preliminary Report on Patentability for International Application No. PCT/US2017/032523, dated Nov. 22, 2018.
Notice of Acceptance for Australian Patent Application No. 2017261802, dated Sep. 9, 2020.
European Search Report for European Application No. 17796989.6, dated Dec. 6, 2019.
Office Action for U.S. Appl. No. 15/594,323, dated Jun. 1, 2018.
Office Action for U.S. Appl. No. 15/594,323, dated Dec. 13, 2018.
Notice of Allowance for U.S. Appl. No. 15/594,323, dated Jan. 15, 2020.
Corrected Notice of Allowance for U.S. Appl. No. 15/594,323, dated Mar. 16, 2020.
Office Action for U.S. Appl. No. 16/861,561, dated Oct. 6, 2020.
Notice of Allowance for U.S. Appl. No. 16/861,561, dated Jan. 25, 2021.
International Search Report for Application No. PCT/US2022/014433 dated May 17, 2022.
Non-Final Office Action received for U.S. Appl. No. 17/328,914 dated Nov. 12, 2021, 34 pages.
Notice of Allowance received for U.S. Appl. No. 17/328,914 dated Mar. 10, 2022, 15 pages.

* cited by examiner

REDUNDANT DISTRIBUTED ANTENNA SYSTEM (DAS) WITH FAILOVER CAPABILITY

CROSS-REFERENCES TO RELATED APPLICATIONS

This application is related to U.S. application Ser. No. 15/594,323, filed on May 12, 2017, entitled "Redundancy in a Public Safety Distributed Antenna System," now U.S. Pat. No. 10,644,798, and U.S. application Ser. No. 16/861,561, filed on Apr. 29, 2020, entitled "Redundancy in a Public Safety Distributed Antenna System," the disclosures of each of which are incorporated herein by reference in their entirety.

TECHNICAL FIELD

The present disclosure generally relates to communications systems, and more particularly to distributed antenna systems and even more particularly to redundant distributed antenna systems with failover capabilities.

BACKGROUND

Public Safety communication systems employing Distributed Antenna Systems (DAS) are deployed and in operation. Public Safety requirements place stringent requirements on system reliability, redundancy and up-time. A DAS typically includes one or more host units, optical fiber or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS at least include reducing average downlink transmit power and reducing average uplink transmit power, as well as enhancing quality of service and data throughput.

Despite the progress made in public safety communications systems, a need exists for improved methods and systems related to public safety communications and the associated infrastructure.

SUMMARY

One exemplary aspect generally relates to public safety communication systems employing Distributed Antenna Systems (DAS) and/or a Digital Distribution System (DDS) as part of a distributed wireless network. More specifically, one aspect relates to a DAS/DDS architecture utilizing a software (re)configurable network. Even more specifically, one aspect relates to a DAS/DDS architecture having a redundant system topology as well as failover capabilities at one or more of the hardware/software level and/or the communication link level.

In one exemplary aspect, the topology includes the use of cross-coupled connections amongst digital hosts, digital distribution section components and/or digital remote radios (DRUs). The technology described herein is at least applicable to a variety of communications systems including systems utilizing various communications standards. Utilizing aspects of the technology disclosed herein, a fully redundant, self-monitoring, self-healing digital DAS/DDS is provided.

Public Safety network operators face the continuing challenge of building extremely robust networks. Mobility and an increased level of multimedia content for end users typically employs end-to-end network adaptations that support new services and the increased demand for broadband Internet access. One of the most difficult challenges faced by Public Safety networks is the ability to have at least 99.999% service availability throughout the network. Firefighters, police, homeland security, etc., all need guaranteed communications in the event of a disaster. A high service availability system requires full redundancy of all elements/components throughout the communication path.

According to one exemplary aspect, a system for data transport in a distributed antenna System is provided. The system includes a plurality of DAUs (Digital Access Units also referred to as Hosts) within headend sections which are connected to one or more BTSs (Base Transceiver Stations) or base station(s) and/or signal sources. The BTSs can optionally be replaced with off-air signals. The off-air signals could originate from the BTSs wirelessly communicating with the DAUs or via repeaters which capture a remote signal from a BTS. The plurality of DAUs are optionally coupled to each other and operable to transport signals between the plurality of DAUs. The system also includes a plurality of DDUs (Digital Distribution Units) in a distribution section. Each of the plurality of DDUs are in communication with one or more of the DAUs using a communications path/link such as an optical link, although any communications link will work. The system further includes a tunnel/station distribution section which includes a plurality of DRUs (Digital Remote Units also referred to as remotes or remote units). Each of the DRUs in one of the plurality of transmit/receive cells is in communication with one or more of the plurality of DDUs using an optical or comparable communications path (e.g., an optical fiber, which is also referred to as an optical cable and is operable to support both digital and/or analog signals (i.e., RF over fiber)).

According to another embodiment, a public safety system for data transport in a Distributed Antenna System (DAS) includes a plurality of Digital Access Units (DAUs), Digital Distribution Units (DDUs) and Digital Remote Units (DRUs). The plurality of DAUs are couplable to each other and operable to transport digital signals therebetween. The system also includes a plurality of Digital Distribution Units. Each of the plurality of DDUs is in communication with the one or more of the DAUs using an electrical/optical communications path. The system further includes a plurality of transmit/receive cells. Each of the plurality of transmit/receive cells includes a plurality of DRUs. Each of the DRUs in one of the plurality of transmit/receive cells is in communication with one or more of the plurality of DDUs using an optical communications path. Redundancy of the Public Safety system is achieve by cross connecting the electrical/optical fibers amongst the plurality of DAU, DDU and DRUs and dynamically managing the interconnecting of the various elements. In conjunction with the dynamic managing of the interconnections, the various system elements are also dynamically managed to bring online an inactive element should an active element fail.

Numerous benefits are achieved over conventional techniques. For instance, advantages at least include the ability to provide routing redundancy and routing reconfigurability. Additionally, non-limiting advantages include the ability to provide for redundancy in the context of DAS-based architectures for public safety communication systems, such as redundant DAUs, DDUs and/or DRUs and the ability to activate, partially activate and/or deactivate one or more portions thereof. This not only provides the required system up-time, but can also provides power saving advantages. These and other embodiments of the technology along with many of its advantages and features are described in more detail in conjunction with the description herein and attached figures.

BRIEF DESCRIPTION OF THE DRAWINGS

The present disclosure is described in conjunction with the appended figures, which are not necessarily drawn to scale.

DETAILED DESCRIPTION

Figure 1:
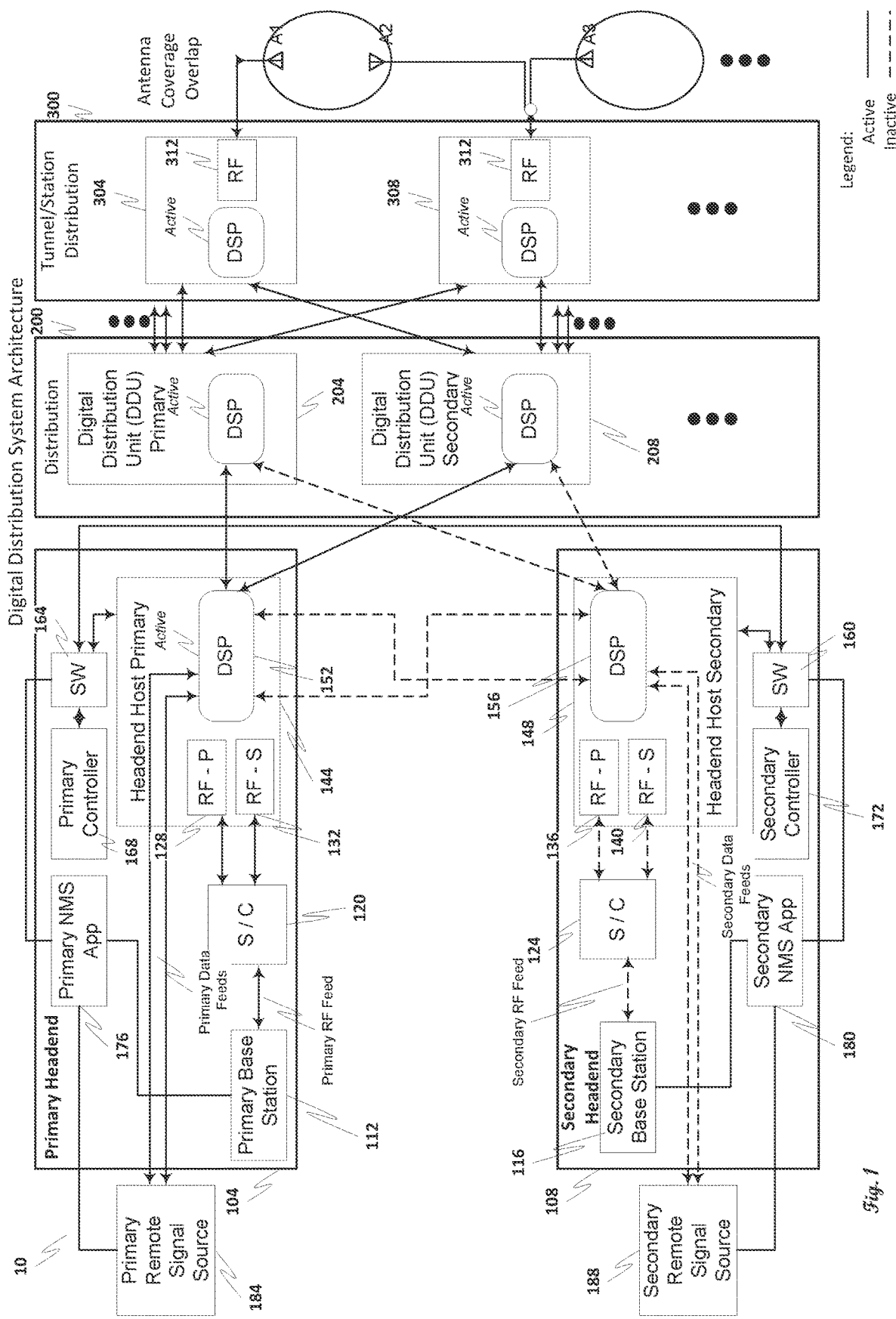
FIG. 1 illustrates an exemplary digital distribution system architecture according to an illustrative aspect.

The ensuing description provides illustrative architectures and operational modes and is not intended to limit the scope, applicability, or configuration of the claims. Rather, the ensuing description will provide those skilled in the art with an enabling description for implementing the described techniques. It being understood that various changes may be made in the function and arrangement of elements without departing from the spirit and scope of the described technology.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

For purposes of explanation, numerous details are set forth in order to provide a thorough understanding of the technology. It should be appreciated however that the technology herein may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, DAS network, or within a dedicated secured, unsecured, and/or encrypted system and/or anywhere within a digital distribution system architecture.

Thus, it should be appreciated that the components of the system can be combined into one or more devices, or split between devices, such as a DAU, DDU, and/or DRU and/or anywhere within the digital distribution system architecture and/or on a particular node of a distributed network, such as a communications network. As will be appreciated from the following description, and for reasons of computational efficiency, the components of the system can be arranged at any location within the communications network without affecting the operation thereof.

Furthermore, it should be appreciated that the various communication links, including the communications channel(s)/links connecting the elements can be wired or wireless links or any combination thereof, or any other known or later developed element(s) capable of supplying and/or communicating data to and from the connected elements. Examples of these communications links include one or more (or a combination) of via an Ethernet cable, optical fiber or optical cable, RF cable, a microwave line of sight link, a wireless link, and/or a satellite link.

The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol.

According to an aspect of the disclosed technology, a Digital Distribution System/Distributed Antenna System (DDS/DAS) is provided with these terms being used interchangeably. The system is comprised of primary and secondary headend (HE), redundant distribution units and plurality of remote units. A distributed system provides an efficient means of utilization of base station resources. The base station or base stations associated with a DAS can be located in a central location and/or facility commonly known as a base station hotel. The DAS network comprises one or more digital access units (DAUs) that function as the interface between the base stations, the digital distribution units (DDUs) and the digital remote units (DRUs). The DAUs can be collocated with the base stations. The DRUs can be daisy chained together, cross connected and/or placed in a star configuration and provide coverage for a given geographical area through their antenna coverage areas. The DRUs are typically connected via the DDUs to the DAUs by employing a high-speed optical fiber links. This approach facilitates transport of the RF signals from the base stations to a remote location or area served by the DRUs using data-over-fiber transport protocol to carry a digital representation of the RF signals.

In accordance with exemplary topologies, conceptually the redundant digital distribution system in a normal operating state is illustrated in FIG. 1. The system comprises a primary and a secondary headend, primary and secondary distribution units and number of remote units (DRU's). System elements can be connected using optical cables or other links as discussed herein.

Each headend is comprised of one (or more) hosts (DAUs), and local Base Stations (or Base transceiver Stations or BTSs) are connected to the host at RF using coaxial cables, and one or more local or remote sources (remote Base Stations with the associated host unit, or BBU/DU (BaseBand Unit(s)/Distribution Unit(s)) or airHosts that pickup off-the-air signals) can be connected to the host over data optical links. The headend also includes a system controller that at least provides control and management of the Digital Distribution System (DDS or digital DAS), and an NMS application that provides management and control of the overall system that includes the DDS, the collocated Base Stations, and other remote source(s) and/or other elements of the system.

In a normal operating state, the primary headend is active, while the secondary headend is in a stand-by mode. The primary and secondary distribution units (DDU's) are both active (in a parallel mode of operation) and connected to the primary host (DAU) via optical (or other type) of link(s). Each remote unit (DRU) is active (atable) and connected to the primary and secondary distribution units via primary and secondary optical links. Remotes (DRUs) can be non-redundant, and redundancy can be achieved via coverage overlap (as presented in FIG. 1), or primary and secondary remote units can be implemented to provide remote element redundancy (without coverage overlap).

In normal circumstances the primary host (DAU) receives signals at multiple bands, in RF (via RF feeds) or in data format (via data feed(s)), and processes (RF to data conversion) and aggregates the signals into a single, high data rate, serial data stream. This data stream, that represents multiple Public Safety signals (PS) and/or cellular signals, is delivered to the primary and secondary distribution unit for further delivery to multiple remote units (DRU's). Each remote unit receives the data stream via primary and secondary optical link(s). Each DRU takes the signal from the primary optical link and translates data stream to multiple RF signals. The RF signals are filtered, amplified and delivered to users' UE (user equipment) via omnidirectional or directional antennas (This represents a description of the downlink signal path).

The primary and secondary controllers can operate in an active/stand-by mode, where the primary Controller provides C&M (Control and Management) of the DDS. The secondary controller is ON and its database/memory is synchronized with the primary controller such that the secondary controller receives telemetry from all DDS elements, but does not provide any management/control actions unless there is a need, such as the failure of the primary controller. The primary and secondary controllers are interconnected via, for example, an ethernet data link to enable information exchange between controllers and DDS elements such as the state and telemetry information mentioned above. In the case of primary controller failure, the secondary controller becomes fully active and takes over control and management of the DDS.

FIG. 1 is a block diagram illustrating the redundant Digital Distribution System in a normal operating state, where the primary headend 104, the DDUs 204, 208 and the DRUs 304, 308 are in an active state, the secondary headend 108 is in a stand-by mode, and the various (redundant) links are active/inactive as illustrated in the figure.

As shown in FIG. 1, the exemplary DDS 10 includes a primary headend 104 and a secondary headend 108. Each headend respectively includes a base station (112, 116), splitter combiner (120, 124), primary and secondary RF (Radio Frequency) modules (128, 132, 136, 140) (which can include amplifiers, filters, etc.) and DSPs (Digital Signal Processors (152, 156)) that are part of the primary and secondary hosts (DAUs) (144, 148), ethernet switches (160, 164), primary and secondary controllers (168, 172), NMS (Network Management Services) application managers (176, 180), connected to signal sources (184, 188).

The DDS 10 further includes a distribution section 200 that includes a plurality of DDUs 204, 208, etc., each including a DSP. The DDS 10 further includes a Tunnel/Station distribution section 300 with a plurality of remote units (DRUs or remote radios) (304, 308) with respective DSPs and remote unit RF sections 312. The remote RF sections are connected to antennas A1, A2, etc., which are arranged such that their antenna coverage areas produce overlapping antenna radiation patterns. Thus, redundancy is achieved through overlapping coverage, which enables the system cost to be reduced (for systems in which the number of remote units is much greater than the number of hosts and distribution units) in comparison with systems that would utilize redundant remotes. If one of the DRUs fails, then coverage in the area covered by the failed DRU will be provided by the other DRU that provides the overlapping coverage. This technique could also be combined with redundant remotes at additional expense.

Each host includes data feeds connecting the host to a remote signal source, with the host further being connected via the switch/combiner and RF feed to the base station. The network management service application (such as computer executable instructions operable to perform the functionality of the flowcharts discussed herein) provides control of the various interconnected elements. The controllers provide instructions for enabling the switching of the ethernet switches and control of the hosts to route data and/or RF from the active feed(s) to the DDUs and DRUs. The controller can be a processor (CPU), ASIC or the like with software/firmware configured to implement the functionality in the flowcharts herein, and in a similar manner the network management service application can include computer executable instructions to provide of or more of network monitoring, QoS monitoring and/or work in combination with the controller to enable the functionality described herein.

The primary 104 and secondary 108 headends can be located at a different geographical locations, and respectively include primary 144 and secondary 148 hosts, which are collocated with the primary 112 and secondary 116 Base Stations. Multiple data feeds that are delivering signals from the other source(s) 184, 188 can also be connected to the headends, such as remote base stations with associated host units, or BBU/DU(s), or local or remote airHost's for off-the-air signal pickup.

Figure 3:
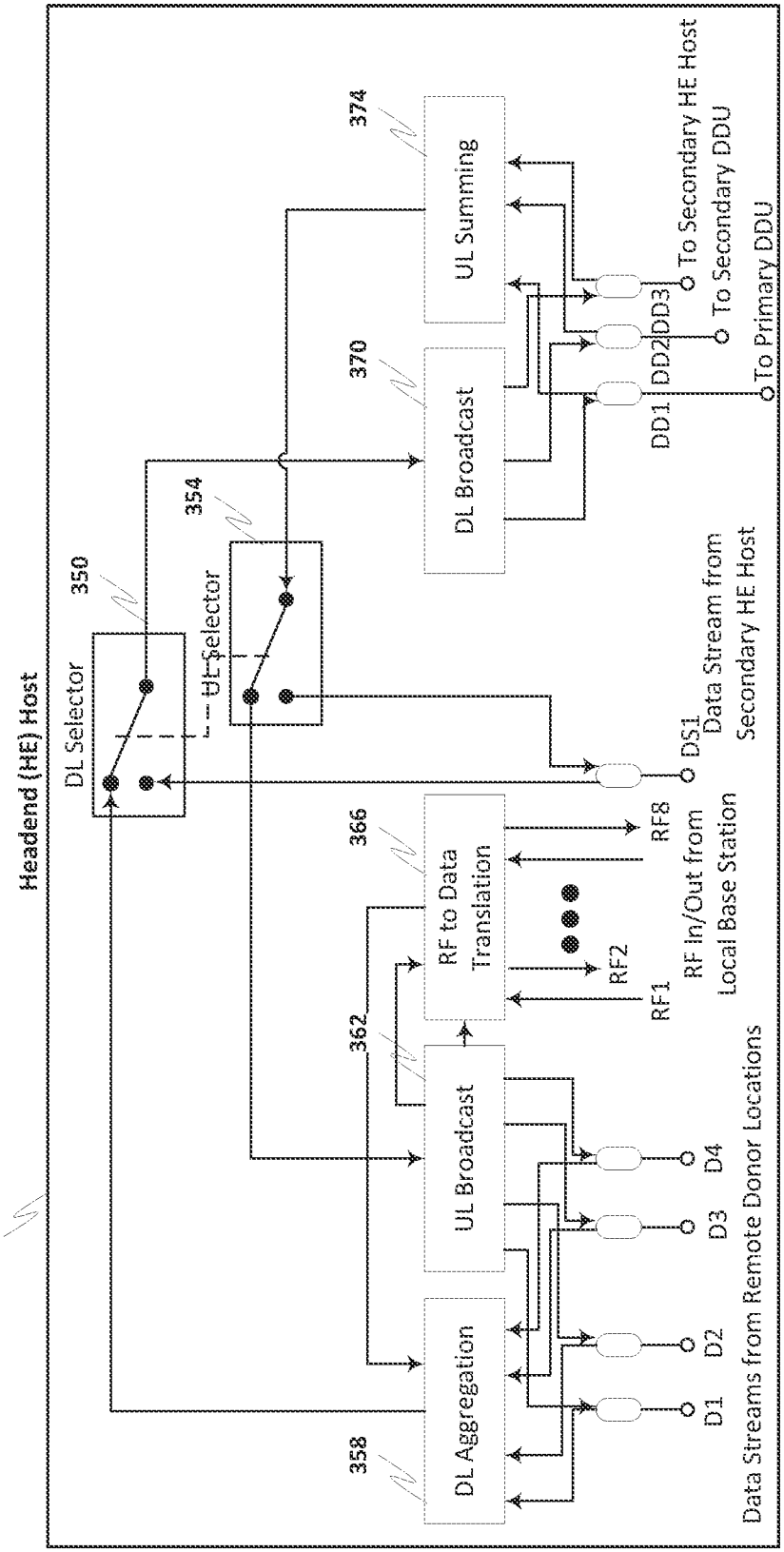
FIG. 3 illustrates a DSP portion of an exemplary headend host according to an illustrative aspect.

Each host 144, 148 has multiple RF ports (128, 132, 136, 140, see also FIG. 3) for receiving RF signals from the collocated base stations (RF1 to RF8 for reception of simplex, Tx and Rx signals, at 4 bands instantaneously), multiple optical ports (D1 to D4) for receiving and aggregating signals received over data links from local or remote signal sources, special aggregation port (DS1) for cross-coupling between primary and secondary HE (secondary to primary host and vice versa), and number of data ports (DD1 to DD3) for aggregated signal distribution/summing (see FIG. 3).

The exemplary hybrid redundancy system is provided through this architecture where the primary and secondary headend locations operate in an active/standby/partially-active redundancy mode with cross-connections, while the distribution and remote elements work in parallel redundancy mode with cross-connections, so that should any of the system element(s)/component(s)/link(s) fail, the corresponding redundant element(s)/component(s)/link(s) is/are ready to carry on the failed task(s) with a minimum switchover time. One optional feature is the inclusion of an active redundancy system—performance of the key elements can be monitored, and information is used by decision making logic to automatically reconfigure the system components if/when a failure is detected.

The high service availability in one aspect is achieved by redundancy of all the elements, which can also be considered as dual modular redundancy. Each element in the network has a secondary failover unit, with failover at the DRUs being provided by overlapping antenna coverage areas as discussed. The secondary units/elements/links work in parallel, so that should any of the primary units/elements/links fail, the secondary unit(s) is/are ready to carry on the task with a minimum or reduced switchover time. Performance of the primary units/elements/links and the secondary units/elements/links is monitored and information used by decision making logic in the controller and/or NMS app to automatically reconfigure system units/elements/links, if failure is detected. Cross connection between system units/network elements provides operational system resilience to simultaneous multi-point failures. Exemplary embodiments provide system availability of up to and exceeding 99.999% availability.

As illustrated in FIG. 1, the primary DAU 144 receives, at the primary RF section (RF-P—128), the primary RF feed from the splitter/combiner 120. The primary DAU 144 also receives, at the secondary RF section (RF-S—132), the secondary feed from the splitter/combiner 120. The splitter/combiner 120 enables the primary RF feed to be received in a redundant manner at the DAU 144. Both the primary feeds are processed in by a DSP in DAU 144. The DAU 144 and in particular the DSP 152 generates a primary data stream for distribution to the DDUs (204, 208) as discussed herein. In between the primary headend 104 and the secondary headend 108, as well as between the secondary headend 108 and the Tunnel/Station Distribution 300, via distribution section 200, multiple optical fibers can carry either the primary feed from the primary headend or the secondary feed from the secondary headend depending on whether the primary headend or the secondary headend is selected by the controller(s). A similar architecture and operation is present in the secondary headend when it is activated.

Cross connection of the DAUs at the digital level is provided as illustrated in FIG. 1. The DSP unit 152 in the primary DAU 144 is connected to the second DSP 156 in the secondary DAU 148 and vice versa via the activatable links shown. The connection of the first DSP 152 and the second DSP 156 enables operation in the event of failure of any of the RF sections in either one of the DAUs. The operation in the event of a failure and the enabling of the various links/elements will be discussed in greater detail hereinafter.

The cross connection between DAU 144 and DAU 148 is implemented, in one illustrative aspect, by connections from the primary DAU 144 (one of the DD1-DD3 ports) to the secondary DAU 148 DS1 port, and from the secondary DAU 148 (one of the DD1-DD3 ports) to the primary DAU 144 port DS1. As described herein, these links can be digital connections between the DSP (and/or FPGA) sections of the DAUs.

Fiber redundancy between the primary headend 104 and the secondary headend 108 to the distribution section can be as follows. For example, the primary DAU 144 outputs the primary data stream, with the primary DAU 144 including a first digital optical output port connected to a first input port on the DDU 204 and a second digital optical output port connected to a first input port on the secondary DDU 208. The secondary DAU 148 outputs a failover data stream, with the failover data stream output via a first digital optical output port connected to a second input port on the DDU 204 and a second digital optical output port connected to a second input port on the DDU 208. In the example configuration, the output from each DAU is transmitted on two fibers, one fiber connects a DAU to a first DDU and a second fiber connects the DAU to a second DDU. In a default mode, for example where there are no failures, the primary data/RF feeds is/are processed by the primary DAU 144 with the DDUs then transmitting the primary data stream to the DRUs.

If the primary RF sections fails in a DAU, the DSP element that monitors the data streams generated by processing the RF signal from the primary (e.g., (RF-P)) and secondary (e.g., (RF-S)) RF section, will switch to the data stream coming from secondary RF section. In this example, if a first DDU receives a primary data stream and a secondary data stream with different feeds, the logic in the DSP of the DDU can be configured to select a data stream to transmit to the DRUs based on one or more signal characteristics.

In FIG. 1, the ellipsis below the DDUs and the DRUs represent implementations in which additional DDUs and/or additional DRUs are utilized. Examples would include implementations in which additional DRUs are provided in tunnels, additional bands are utilized, and/or the like. One of ordinary skill in the art would recognize many variations, modifications, and alternatives based on this foundational structure and operation.

In the system illustrated in FIG. 1, the DRUs receive redundant digital data streams from the active DDU(s) using cross connections between the DRU and DDUs. For example, DRU 304 includes a first input port coupled to a first output port of the DDU 204 and a second input port coupled to the first output port of DDU 208. DRU 308 includes a first input port coupled to a second output port of the DDU 204 and a second input port coupled to the second output port of the DDU 208. DRU 304 and DRU 308 process the digital data streams and provide RF signals using an RF output port to antennas A1 and A2/A3 respectively. A1 and A2 are arranged such that their antenna coverage areas produce overlapping antenna radiation patterns for redundancy. Thus, redundancy is achieved through overlapping coverage, which enables the system cost to be reduced (for systems in which the number of remote units is much greater than the number of hosts and distribution units) in comparison with systems that would utilize redundant remotes. If one of the DRUs fails, then coverage in the area covered by the failed DRU will be provided by the other (overlapping) DRU(s).

Figure 2:
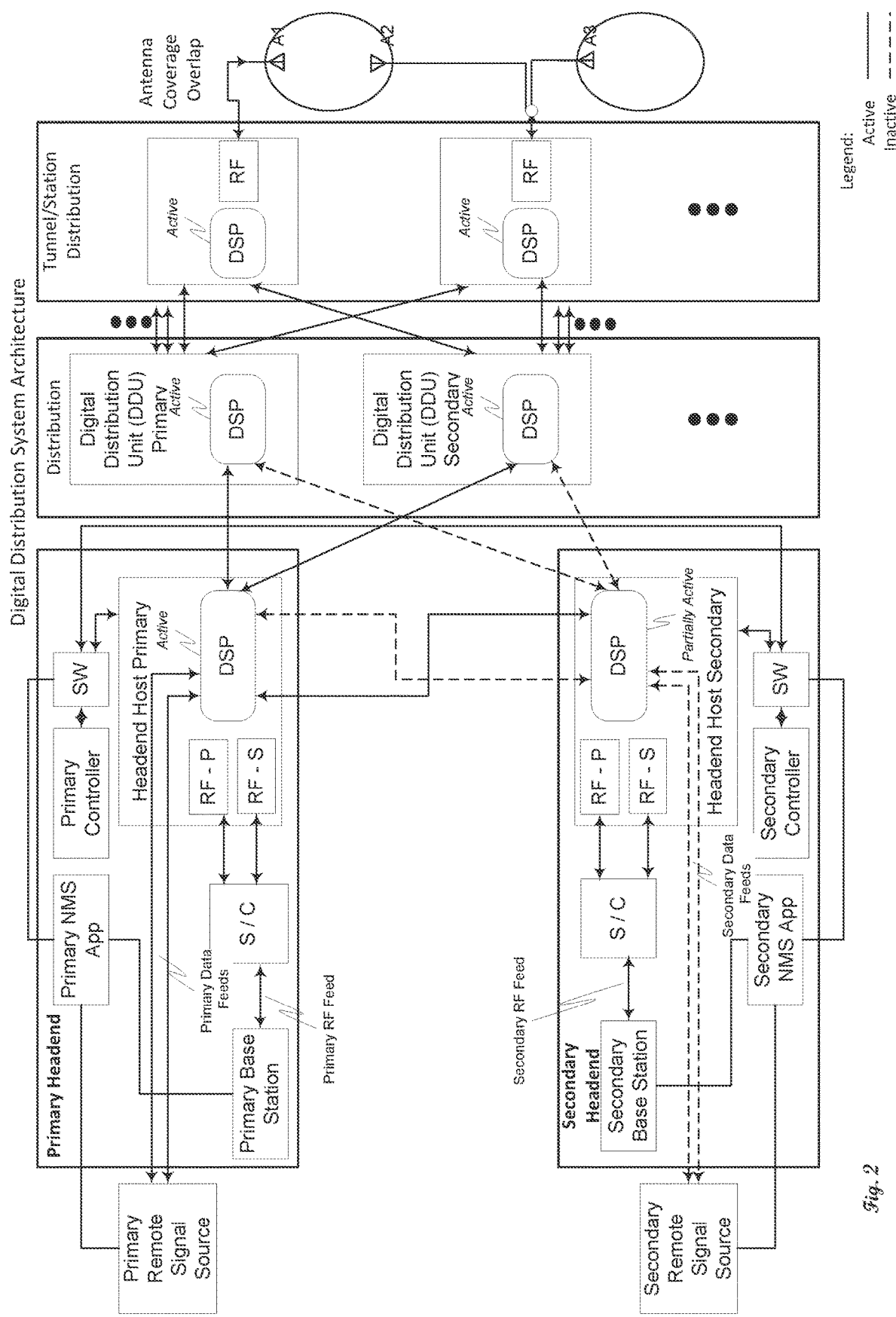
FIG. 2 illustrates an exemplary digital distribution system architecture according to another illustrative aspect.

Conceptually when there is a partial base station failure detected at the primary headend, operation transitions to that illustrated in FIG. 2. When one or more base station transceivers fail, that implicates that one or more signals are not operational (e.g., s1, s3, and s5), and the primary base station can communicate this specific alarm to the primary NMS (Network Management System) Application. The primary NMS Application issues a command to the secondary NMS Application to turn ON specific transceivers at the secondary base station (e.g., s1, s3 and s5) located at the secondary headend. Another implementation option is that the secondary base station is always active, hence commend(s) from the NMS Application may not be required. At the same time, the primary controller receives information from the primary NMS Application about the primary base station failure, and issues a command to the secondary host (DAU) to transition from a stand-by state to a partially-active state and enable particular processing elements. The secondary host (DAU) receives signals (s1, s3, and s5, or a full set) from the secondary base station, translates them to a data stream and via a DD3 data port and optical link, delivers sub-set of signals to primary host (DAU). The primary host receives a subset (or full set) of signals at the DS1 port and via the selection DSP blocks (350 and 354) aggregates specific signals (see FIG. 3) from the secondary host (e.g., s1, s3 and s5) with active signals processed in the primary host. The complete set of signals is then delivered from primary host to the primary and secondary distribution units and remote units as discussed.

Similarly, if one or more of the data links from the remote (or local) signal sources fail, the secondary headend is set to a partially-active mode and tasked to substitute the failed data links at the primary headend as described later in relation to FIG. 4.

Failure of a primary signal source is detected at the source (BS or/and host, or airHost) or/and by the primary Host (DAU) if a fiber link from primary signal source to primary host is cut (primary hosts detects loss of sync on particular data port (e.g., D2)). An alarm from particular primary source or/and primary host is communicated to the primary NMS Application and the primary controller. The primary NMS Application issues a command to secondary NMS Application to turn ON specific secondary signal source (Base Station). Simultaneously, the primary controller issues commend to secondary host (DAU) to transition from stand-by to partially-active state and enable particular processing elements—data port (D2) and DSP processing modules that follow. Secondary host (DAU) processes signals received on a particular data port (D2) and via DD3 data port and optical link, delivers a sub-set of signals to primary host (DAU). The primary host receives the subset of signals at the DS1 port and via the selection DSP blocks aggregates signals from the secondary host with active signals processed in a primary host. A full set of signals is then delivered from the primary host to primary and secondary distribution units and remote units.

In the case of catastrophic failure of the primary host, the secondary headend transitions to full active state, while the primary headend is in an OFF state until necessary repairs are performed. At the time when the primary host is fully functional again, the primary host can be set to stand-by mode, or can reassume a primary role and revert to active mode.

FIG. 2 is a block diagram (where the callouts similar to FIG. 1 have been omitted for clarity) illustrating the redundant Digital Distribution System in an operating state where the primary headend is in an active state, and the secondary headend is in a partially-active mode, since failure of a portion of the primary base station has been detected. The portion of secondary base station associated with the secondary RF feed is activated together with secondary host, to deliver particular signals from the secondary base station to the primary host to substitute the good RF feed from the secondary base station for the failed signals from the primary base station. The signals from the secondary base station are delivered over the headend-to-headend (DSP to DSP) cross connection optical data link illustrated as active. This data stream is then distributed to the DDUs and DRUs in a similar manner to that illustrated in FIG. 1.

FIG. 3 is a bock diagram illustrating an exemplary configuration of the headend hosts with certain processing elements and associated external ports that allow the selecting and routing of signals that provide for the redundancy described herein. The exemplary host in FIG. 3 from the primary headend is mirrored in the secondary headend.

Each host includes a downlink selector (switch) 350 and an uplink selector (switch) 354 controlled by the respective controller, a downlink aggregator 358 that combines data streams from one or more remote locations, an UL broadcast block 362 that distributes digital uplink signals to the remote locations, and an RF to data translator 366. The host 144, 148 further includes a downlink broadcast block 370 that distributes the digital downlink signal to the DDUs/other host, or directly to remote units, and an uplink summer 374 that combines the digital signals coming from the primary DDU, secondary DDU and headend host for forwarding to the UL selector 354. The various inputs/outputs to the various blocks and input/output ports are illustrated and labeled in FIG. 3

Figure 4:
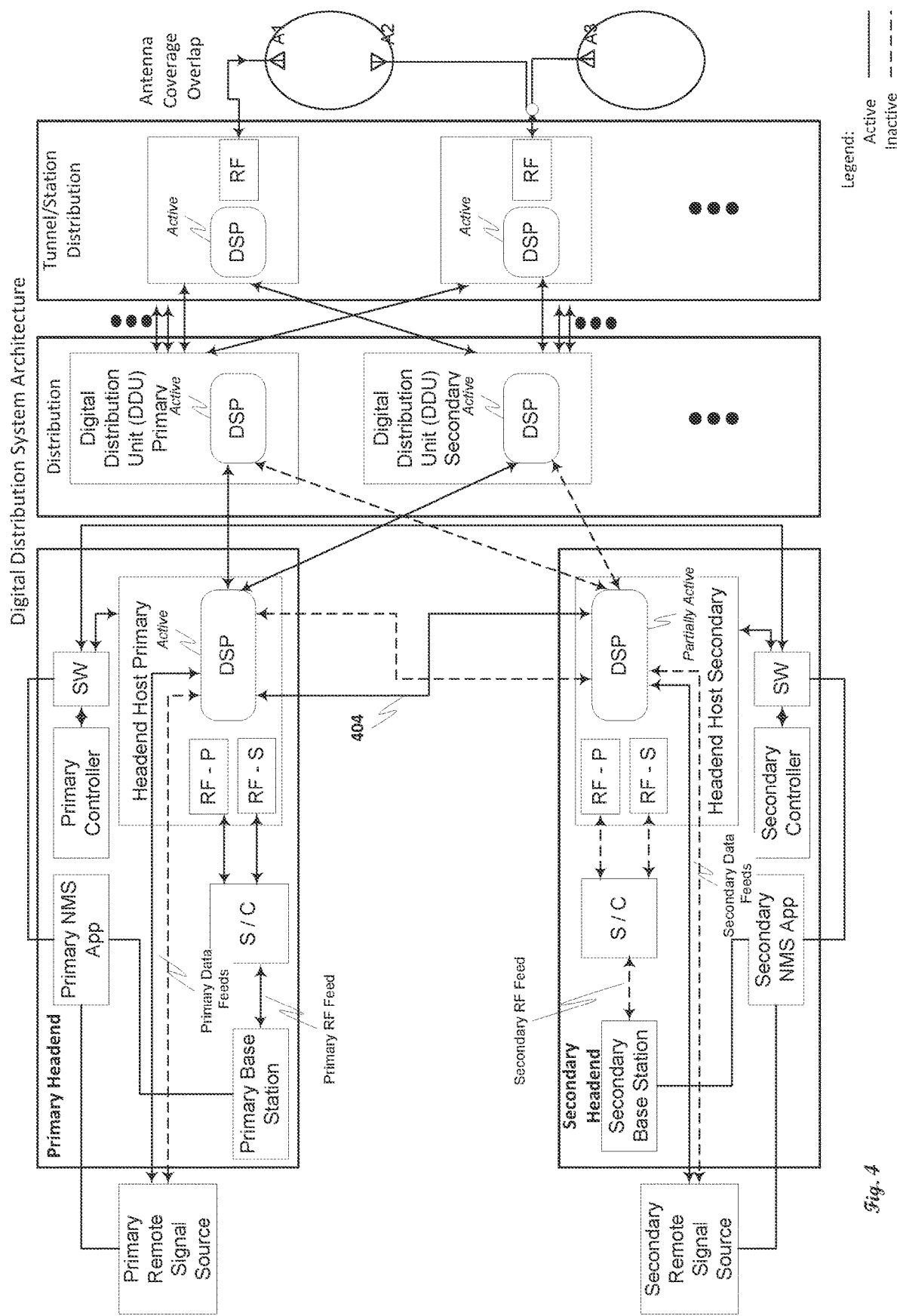
FIG. 4 illustrates an exemplary digital distribution system architecture according to another illustrative aspect.

FIG. 4 is a bock diagram (where the callouts similar to FIG. 1 have been omitted for clarity) illustrating the redundant Digital Distribution System in an operating state where primary headend is active, and the secondary headend is in a partially-active mode (similar to FIG. 2), when failure of the particular data link to the remote source is detected by the controller/NMS app. Here, one of the primary data feeds in the primary headend has failed, and a secondary data feed in the secondary headend is activated to replace the failed data feed in the primary headend. Specifically, the particular data link (shown as solid) at the secondary headend is activated together with a portion of the secondary host, to deliver signals to the primary host and substitute the failed ones. The substitute signals are delivered over the DSP-to-DSP cross connection optical data link 404. The remaining portions of the system operate as in FIG. 1.

Figure 5:
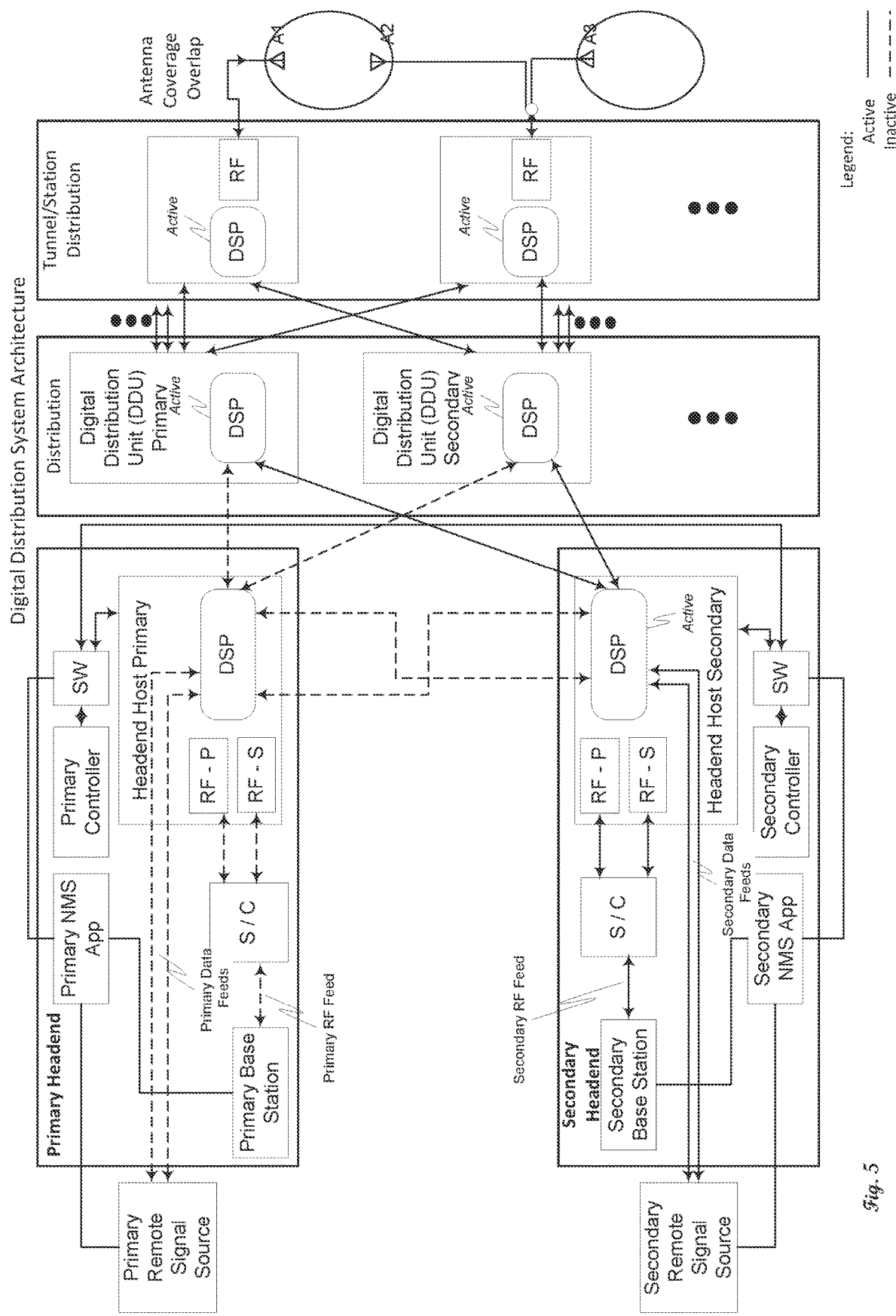
FIG. 5 illustrates an exemplary digital distribution system architecture according to another illustrative aspect.

FIG. 5 is a bock diagram (where the callouts similar to FIG. 1 have been omitted for clarity) illustrating the redundant Digital Distribution System in an operating state where the primary headend is OFF due to, for example, a major failure (primary host failure), and secondary headend is brought into a fully active mode to replace the lost functionality/signals from the primary headend. All the signals from local and remote signal sources, received in a RF or data format, are processed by the secondary host (DAU) and delivered via optical links to the primary and secondary distribution units and remotes (DRU's). Also, the secondary headend operates in the same manner as the primary headend did in FIG. 1, replacing its functionality, with all other elements in the distribution section and the tunnel/station distribution sections operating as in FIG. 1 with the signals being sent/received from the secondary headend as the failover. Thus, the signals from one or more of the secondary remote signal source and/or the secondary base station are provided to/received from the DDUs/DRUs. As the primary host has failed, the cross connections between the DSP are inactivated, as well as the primary data feeds and primary RF feed. Similarly, the connections from the primary host DSP to the DDUs are inactivated by turning off the ports in the primary host.

Figure 6:
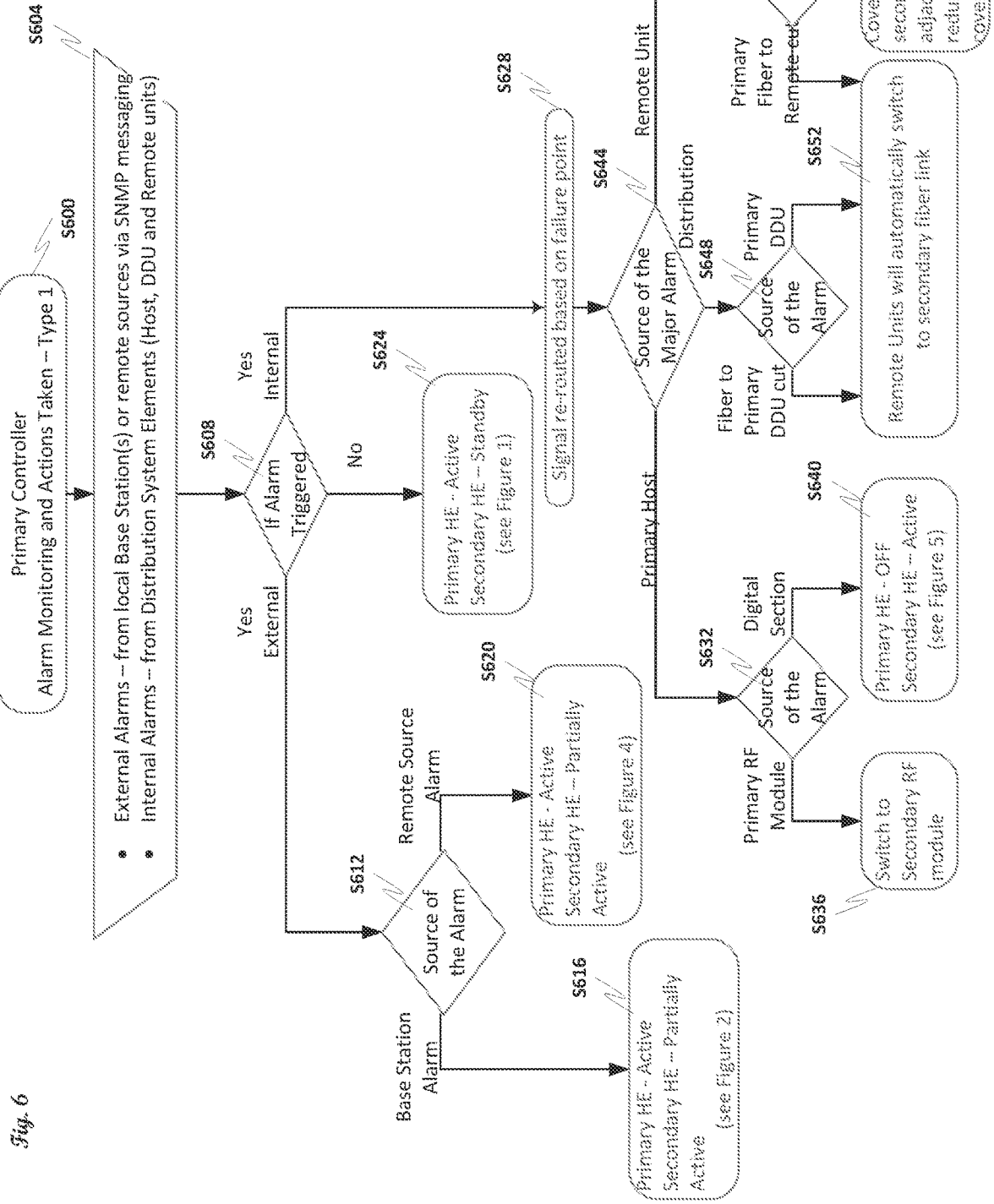
FIG. 6 is a flowchart illustrating an exemplary operation of the primary controller.

FIG. 6 is a flowchart illustrating actions taken by the primary controller and/or system elements in response to external or internal failure alarms—such as the first type of operation/failures discussed in relation to FIGS. 1-5. Control begins in step S600 and continues to step S604.

In step S604, one or more of external and/or internal alarm inputs are monitored. The external alarm(s) can be from one or more of local base station(s) and/or remote sources signaled via SNMP messaging, for example. The internal alarm(s) can be from distribution system elements such as a host, DDU(s), DRU(s). In step S608, a determination is made if an alarm is triggered and whether the alarm is internal or external. If external, control jumps to step S612. If internal, control jumps to step S628, with control otherwise continuing to step S624.

In step S612, the source of the alarm is determined. If a base station alarm, control continues to step S616 where the primary headend is active, and the secondary headend is partially active as shown in FIG. 2. If a remote source alarm, control continues to step S620 where the primary headend is active, and the secondary headend is partially active as shown in FIG. 4.

In step S624, and when there is no alarm, the primary headend is active and the secondary headend is in standby as shown in FIG. 1.

If an internal alarm is triggered, in step S628 the signal is re-routed based on the failure point. As such, in step S644, a determination is made regarding the source of the alarm. If a primary host alarm, control continues to step S632. In step S632, a determination is made if the failure in the primary host was with the primary RF module or the digital section. If the failure was in the primary RF module, control continues to step S636 where a switch to the secondary RF module is made. If the failure was in the digital section, in step S640 the primary headend is turned off and the secondary headend is activated as shown in FIG. 5.

If the source of the alarm is in the distribution, in step S648 a determination is made if the fiber to the primary DDU was cut. If so, control continues to step S652 where the remote units automatically switch to a secondary fiber link. If a primary DDU failure, control continues to step S652 where the remote units automatically switch to a secondary fiber link.

If the source of the alarm is in a remote unit, control continues to step S656 where the source of the alarm is determined. If the fiber to the remote unit is cut, control continues to step S652 where the remote units automatically switch to a secondary fiber link.

If the source of the alarm is in the remote unit, control continues to step S660 where coverage is provided by a secondary remote unit, or coverage is provided by an adjacent remote unit if the redundancy is provided by coverage (antenna) overlap.

Figure 7:
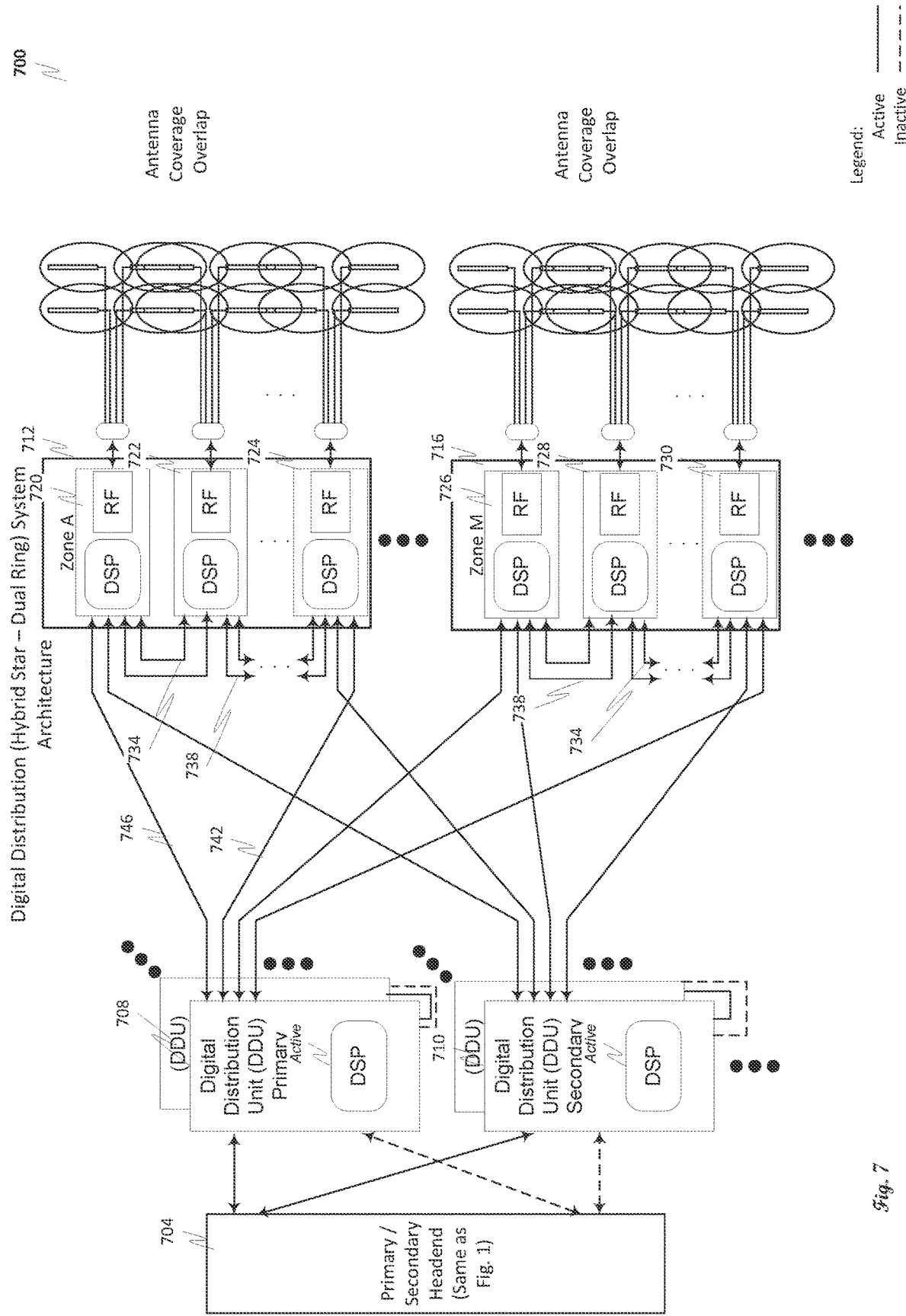
FIG. 7 illustrates an exemplary digital distribution system architecture according to one illustrative aspect.

FIG. 7 is a bock diagram illustrating another exemplary redundant Digital Distribution System 700 in a normal operating state where the primary headend is in an active state, and the secondary headend is in a stand-by mode. This exemplary system has hybrid star-dual ring topology. Remote units are organized in multiple zones, and zones are fed from primary and secondary distribution units in a star configuration. Remote units inside each zone are cascaded to each other, and fed from both ends, forming a dual, primary and secondary, distribution ring.

In FIG. 7, the remote units are organized in multiple signal distribution zones where the zones (A-M) are connected to the primary and the secondary headend in a star configuration as shown in the figure, and each zone is fed by a primary and a secondary data stream.

Similar to the earlier described DDS, each headend is comprised of a host, local base stations that are connected to the host at RF using coaxial cables, and one or more local or remote sources (base stations with associated host unit, or BBU/DU, or airHosts that pickup off-the-air signals) that are connected to the host over data optical links. The host is connected to primary and secondary distribution blocks that can be comprised of one or more cascaded distribution units (DDU's). The headend is also housing a system controller unit that provides management and control of the DDS, and an NMS Application that provides management and control of the overall system that includes the DDS, the collocated base stations, and/or other remote sources.

In the normal operating state, the primary headend as active, while the secondary headend is in a stand-by mode. However, the secondary distribution block is also in an active state, with all remote units being active, and being fed by the primary and secondary data streams, and initially processing signals received on a primary data interface. Remotes can be non-redundant, if redundancy is achieved via coverage overlap (as presented in FIG. 7), or primary and secondary remote units can be implemented to provide remote element redundancy (without coverage overlap).

Actions taken in the primary and secondary headend in a case of failure are identical to the ones performed as described in relation to earlier embodiments.

The remote units in each zone are cascaded to each other, and the data stream from the primary distribution DDU is delivered to the first remote unit, that is cascaded to a second remote unit, and to the next . . . . From the last remote unit in the daisy chain, the data stream is delivered back to the primary DDU, forming a primary signal distribution ring.

The data stream from the secondary DDU is also delivered to cascaded remotes forming a secondary signal distribution ring.

Each remote has 4 optical data ports. Two are used to establish connection to the primary distribution ring, and the other two to establish connections for the secondary distribution ring. To further increase resilience and robustness of the system, each remote is equipped with a dual optical by-pass switch (not shown), one for the primary and other for the secondary distribution ring.

To enable proper simulcast operation of the remotes in the ring, delay compensation can be applied at each remote, to ensure that transmission of the DL signals at each remote, and reception of the UL signals at each remote are synchronized and performed at the same instance in time.

In normal circumstances the remote units process the data stream delivered over the primary distribution ring. In the case of primary distribution unit failure, the remotes automatically switch to secondary signal distribution ring. In the case of a remote failure primary (and secondary), the by-pass switch decouples the failed remote and maintains data flow through the ring. In the case of a fiber cut between two remotes or between a remote and the distribution unit, the primary ring is transformed into dual cascaded (daisy-chain) topology. In the case of a primary fiber cut at the second location, system transitions to the secondary signal distribution ring. In the case of fiber cut in a secondary distribution ring, the secondary ring is transformed into dual cascaded topology. In this way multiple failures can be handled and overcome (healed) by the system.

Specifically, in FIG. 7, the primary and secondary headends are the same as in FIG. 1 and are represented by 704. Similarly, there are a plurality of DDUs 708-710 that operate in a manner comparable to the DDUs in the proceeding figures which optionally include additional redundant DDUs as shown in the figure that can be connected via one or more active/inactive links and can be switched on/off in a similar manner to other components in the event of a failure. Dependent on number of zones that need to be connected to primary and secondary DDU's, primary and secondary distribution block can be created by cascading multiple DDU's at each block. Multiple primary and secondary distribution block can be fed from primary and secondary host units (DAU's). The DDUs are connected to zones (712, 716), each including a plurality of DRUs or remote units 720-730 connected to antennas that can optionally provide redundancy through overlapping coverage areas as described.

To achieve the hybrid-star dual ring configuration, DDU 708 is connected to DRU 720 in Zone A, as well as DRU 724. DDU 708 is also connected to DRU 726 in Zone M, as well as DRU 730. In this exemplary configuration, the connections from DDU 708 to the DRUs in Zone A through M are active. In an exemplary configuration, the links connecting the elements are optical cable but any other connection type will work as described herein.

Similarly, DDU 710 is connected to DRU 720 in Zone A, as well as DRU 724. DDU 710 is also connected to DRU 726 in Zone M, as well as DRU 730. In this exemplary configuration, the connections from DDU 708 to the DRUs in Zone A and M are also active.

The DRUs are also interconnected, with in FIG. 7, each DRU is connected to another DRU through at least one primary 734 and at least one secondary 738 link(s).

In the event of a fiber cut, for example, communications from the DDU to the DRUs can be maintained. For example, if fiber 742 to Zone A is cut, fiber 746 can supply all the DRUs via interconnects 734. Similarly, if fiber 734 is cut, the primary ring is transformed to a dual cascade topology where fiber 746 and a portion of 734 fiber (up to the cut location) form one cascade branch, and fiber 742 and other portion of the 743 fiber (below the cut location) form second cascade branch. If fiber 734 is cut in two places the DRUs 720-724 in Zone A will switch to secondary fiber ring 738.

Details of the failover and redundancy provisions of the embodiment of FIG. 7 will be discussed below in relation to FIG. 8. However, in general, the operations of failover and redundancy of the primary and secondary headends and DDUs are the same as described elsewhere herein.

Figure 8:
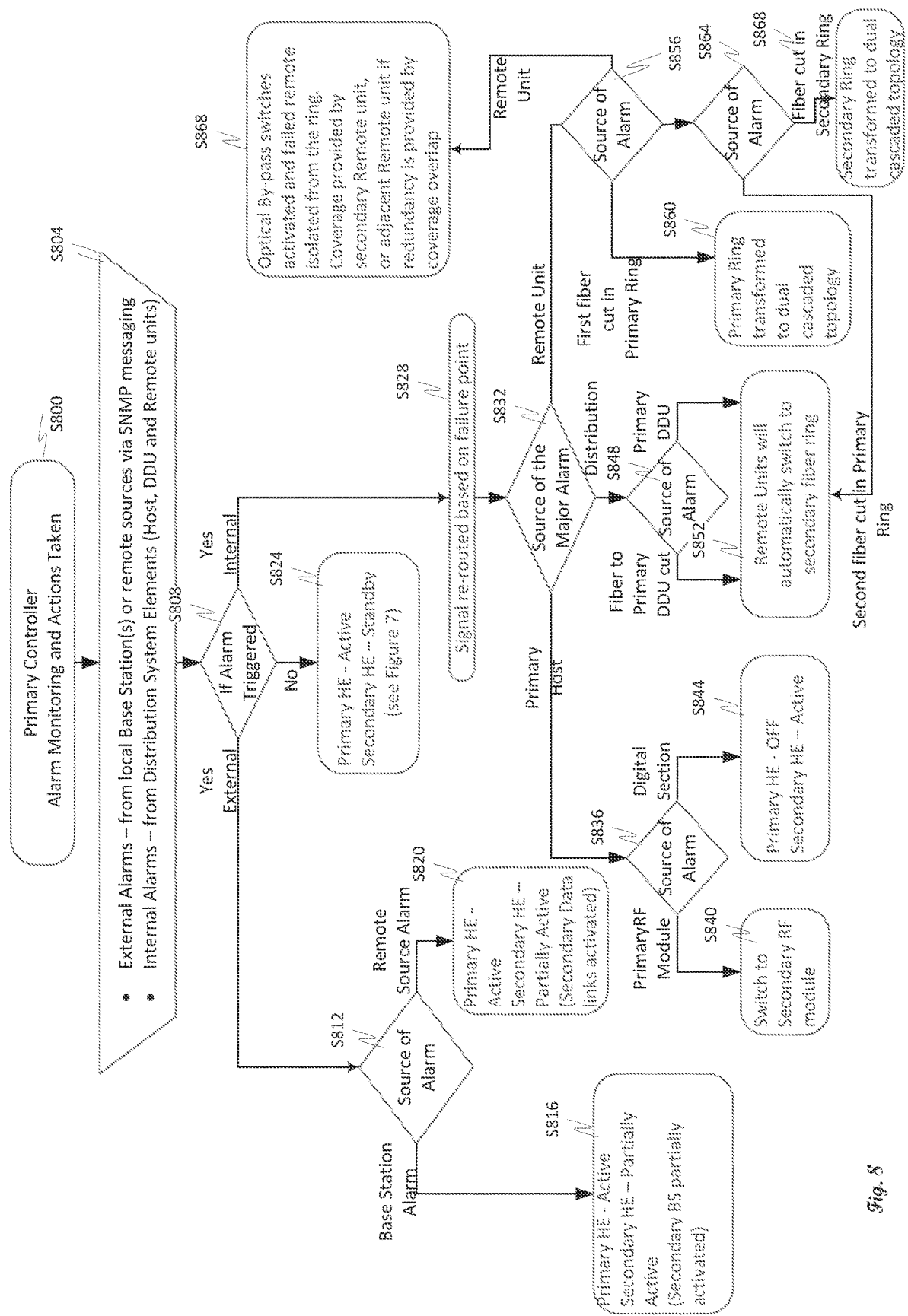
FIG. 8 is a flowchart illustrating another exemplary operation of the primary controller.

FIG. 8 is a flowchart illustrating actions taken by the controller, or one or more system elements, in response to external or internal failure alarms in the embodiment shown in FIG. 7. Control begins in step S800 and continues to step S804.

In step S804, monitoring of one or more of external and internal alarms commences, with the external alarms originating from local base stations and/or remote sources. Signaling of these alarms can be accomplished via SNMP messaging or comparable messaging services. Internal alarms can be from distribution elements such as one or more hosts, one or more DDUs and/or one or more remote units. The monitoring can be performed by, for example, one or more of the controllers described herein and/or a dedicated monitoring system (not shown). Control then continues to step S808.

In step S808, a determination is made whether an alarm has been triggered. If an external alarm is triggered, control jumps to step S812. In step S812, a further determination is made whether the source of the alarm is a base station alarm or a remote source alarm. If a base station alarm, control jumps to step S816 where the primary headend is active, the secondary headend is partially active and the secondary base station is partially activated. If a remote source alarm, control jumps to step S820 where the primary headend is active, the secondary headend is partially active with the secondary data links activated.

If there is no alarm, control continues to step S824 where the primary headend is active, and the secondary headend is in a standby more as shown in FIG. 7.

If the alarm is an internal alarm, control continues to step S828. In step S828, signal (re)routing based on a detected failure point occurs. Specifically, in step S832 the source of the alarm is determined.

If a primary host alarm, control continues to step S836. In step S836, a further determination of the source of the alarm is made. If a primary RF alarm, control continues to step S840 where a switch to the secondary RF is made. If the source of the alarm is in the digital section, control continues to step S844 where the primary headend is off, and the secondary headend is active.

If the source of the alarm is in the distribution section, control continues to step S848 where a determination is made as to whether the source of the alarm is a fiber cut to the primary DDU or the DDU itself. If a fiber is cut, control continues to step S852 where the remote units will automatically switch to a secondary fiber ring. If there is a primary DDU failure, control continues to step S852 where the remote units will automatically switch to a secondary fiber ring.

If the source of the alarm is in a remote unit, control continues to step S856. In step S856, a determination is made as to the source of the alarm. If there is a first fiber cut in a primary ring, control continues to step S860 where the ring is transformed into a dual-cascaded topology.

If the alarm is in a remote unit, control continues to step S868 where optical bypass switch(es) can be activated and the failed remote isolated from the ring, with coverage being provided by the secondary remote unit, or an adjacent remote unit(s) if redundancy is provided by the antenna coverage overlap.

If there is an additional type of alarm, control continues to step S864 where a further determination of the source of the alarm is made. If the is a second fiber cut in the primary ring, the affected remote units can automatically switch to the secondary fiber ring in step S852. If there is a fiber cut in the secondary ring, the secondary ring is transformed to the dual cascaded topology as shown in FIG. 7.

Figure 9:
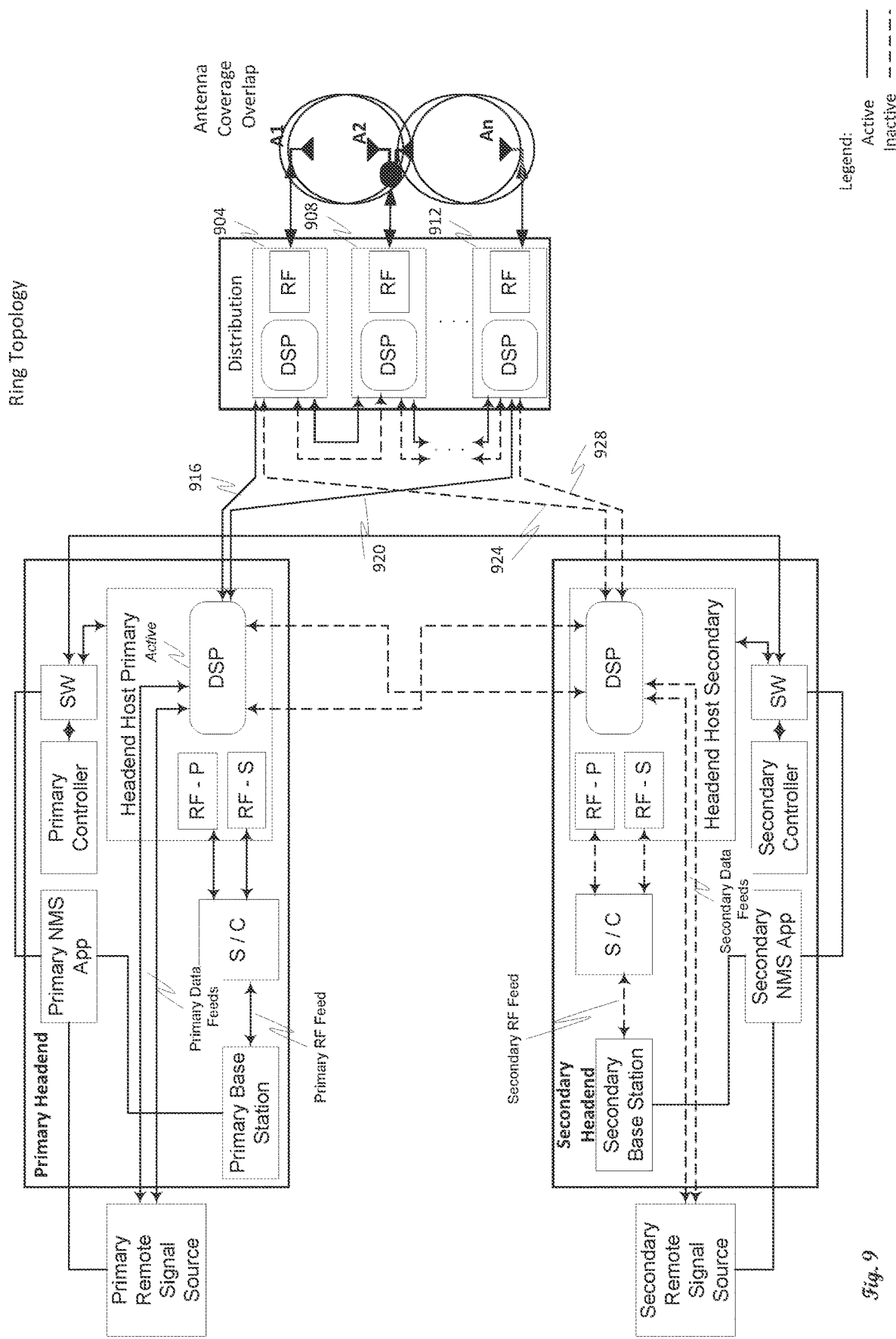
FIG. 9 illustrates an exemplary digital distribution system architecture ring topology according to another illustrative aspect.

FIG. 9 is a block diagram illustrating another exemplary redundant Digital Distribution System in a normal operating state where primary headend is in an active state, and the secondary headend is in a stand-by mode. The primary and secondary headends are the same as illustrated in FIG. 1, and thus the callouts have been omitted for clarity. Similar to the other topologies, the system includes a primary and secondary headend, and number of remote units. The remote units are cascaded to each other, and fed from both ends, forming dual, primary and secondary, distribution ring(s). This exemplary DDS can be considered a subset of the FIG. 7 DDS. Similar to the FIG. 7 DDS, each headend is comprised of a host, local base stations that are connected to the host at RF using coaxial cables, and one or more local or remote sources (base stations with associated headend or BBU/DU and/or airHosts that pickup off-the-air signals) that are connected to the host via data optical links. However, instead of an intermediary distribution unit(s), The host is connected directly to cascaded remote units.

Similar to the other systems, the headend also includes a system controller unit that provides management and control of the DDS, and an NMS Application that provides management and control of the overall system that includes the DDS, the collocated base stations, and/or other remote sources. Actions taken in the primary and secondary headend in a case of failure are similar to those described in the FIG. 7 DDS.

The remote units are cascaded to each other. The data stream from primary host is delivered to the first remote unit, that is cascaded to second remote unit, and to the next . . . . From the last remote unit in the daisy chain, the data stream is delivered back to the primary host, forming a primary signal distribution ring.

The data stream from a secondary host is also delivered to the cascaded remotes forming the secondary signal distribution ring. Each remote has 4 optical data ports. Two are used to establish connection to the primary distribution ring, and the other two establish connections for the secondary distribution ring. To further increase resilience and redundancy of the system, each remote is equipped with a dual optical by-pass switch, one for primary and other for secondary distribution ring.

To enable proper simulcast operation of the remotes in the ring, delay compensation can be applied at each remote to ensure that transmission of the DL signals at each remote, and reception of the UL signals at each remote are synchronized and performed at the same instance in time.

In normal operation the remote units process the data stream delivered over the primary distribution ring. In the case of primary host failure, remotes automatically switch to the secondary signal distribution ring. In the case of a remote failure, a by-pass switch decouples the failed remote and maintains data flow through the ring. In the case of fiber cut between two remotes or between a remote and the host, the primary ring is transformed into a dual cascaded (daisychain) topology. In the case of primary fiber cut at a second location, the system transitions to the secondary signal distribution ring. The primary controller receives an alarm from the remote units in the daisy-chain below the cut point and the controller activates the secondary headend and issues a commend to all remotes to switch to secondary distribution ring. In the case of a fiber cut in a secondary distribution ring, the secondary ring is transformed into the dual cascaded topology.

This exemplary configuration implements a ring topology directly between the headends and the distribution section that includes the DRUs. The remote units 904-912 are cascaded to each other, and fed from both ends (i.e., from link 916 to DRU 904 and from link 920 to DRU 912, with each DRU being interconnected with one or more active and/or inactive links, such as fiber cable). This configuration is mirrored from the secondary host, forming a dual, primary and secondary, distribution ring, i.e., the primary ring comprises links 916 and 920 from the primary host and the corresponding links linking each DRU 904-912, and the secondary link includes links 924 and 928 from the secondary host and the corresponding links linking each DRU 904-912.

Figure 10:
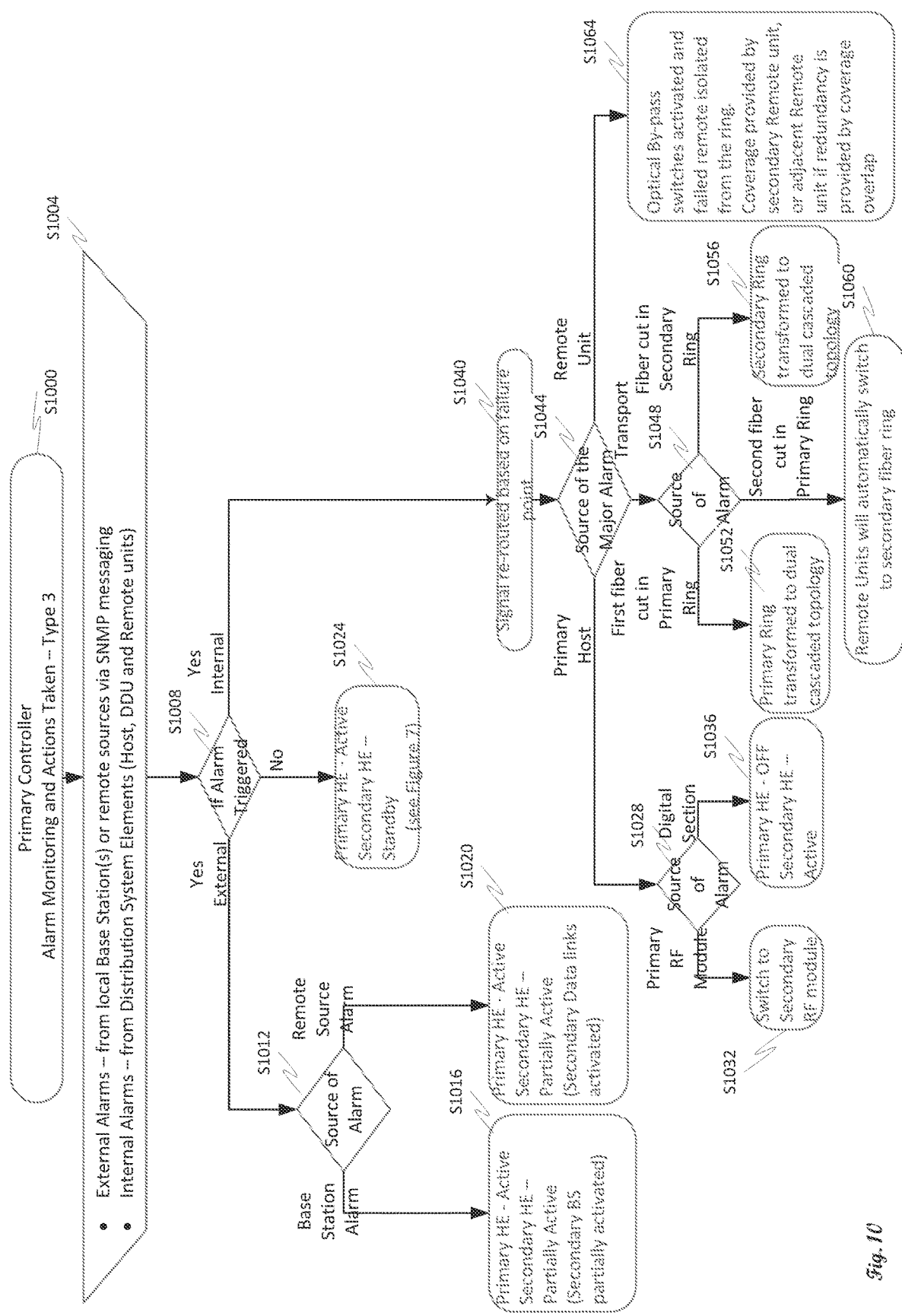
FIG. 10 is a flowchart illustrating another exemplary operation of the primary controller.

FIG. 10 is a flowchart illustrating actions taken by the controller, and/or system elements, in response to external or internal failure alarms in the system depicted in FIG. 9. Specifically, control begins in step S1000 and continues to step S1004.

In step S1004, monitoring of one or more of external and internal alarms commences, with the external alarms originating from local base stations and/or remote sources. Signaling of these alarms can be accomplished via SNMP messaging or comparable messaging services. Internal alarms can be from distribution elements such as one or more hosts, one or more DDUs and/or one or more remote units. The monitoring can be performed by, for example, one or more of the controllers described herein and/or a dedicated monitoring system (not shown). Control then continues to step S1008.

In step S1008, a determination is made whether an alarm has been triggered. If an external alarm has been triggered control continues to step S1012. In step S1012, a determination is made about the source of the alarm. If a base station alarm, control continues to step S1016 where the primary headend is active, the secondary headend is partially active and the secondary base station is partially active. The secondary host processes sub-set of signals from the secondary base station (that are failed at the primary headend) and delivers them to the primary host where they are aggregated with active signals processed by the primary host.

If a remote source alarm has been triggered, control continues to step S1020. In step S1020, the primary headend is active, the secondary headend is partially active and the secondary data links are activated. The secondary host processes sub-set of signals received over secondary data link (that are failed at the primary headend) and delivers them to the primary host where they are aggregated with active signals processed by the primary host.

If there is no alarm in step S1008, control continues to step S1024 where the primary headend is active and the secondary deadens is in a standby mode as illustrated in FIG. 7.

If the alarm is internal, control continues to step S1040 where signal rerouting based on the failure point is initiated. Thein, in step S1044, a determination is made as to the source of the alarm.

In step S1044, a determination is made about the source of the alarm. If the alarm is from a primary host, control continues to step S1028. In step S1028 the source of the alarm is further identified as from a primary RF failure or from a digital section.

If an RF failure, control continues to step S1032 where a switch is made to the secondary RF module. If in the digital section, control continues to step S1036 where the primary headend is turned off and the secondary headend is brought online and is active.

If the source of the alarm is in the transport section, control continues to step S1048 where the source of the alarm is identified. if a first fiber cut in the primary ring, control continues to step S1052 where the primary ring is transformed into a dual cascaded topology. If there is a second fiber cut on the primary ring, control continues to step S1060 where the secondary headend is activated and remote units can automatically switch to the secondary fiber ring.

If there is a fiber cut in the secondary ring, in step S1056 the secondary ring is transformed into a dual cascaded topology.

If the source of the alarm is in a remote unit, control continues to step S1064 where an optical bypass switches the activated and the failed remote which is isolated them from the ring and coverage can be provided by the secondary remote unit, or adjacent remote unit(s) when redundancy is provided through coverage overlap.

Figure 11:
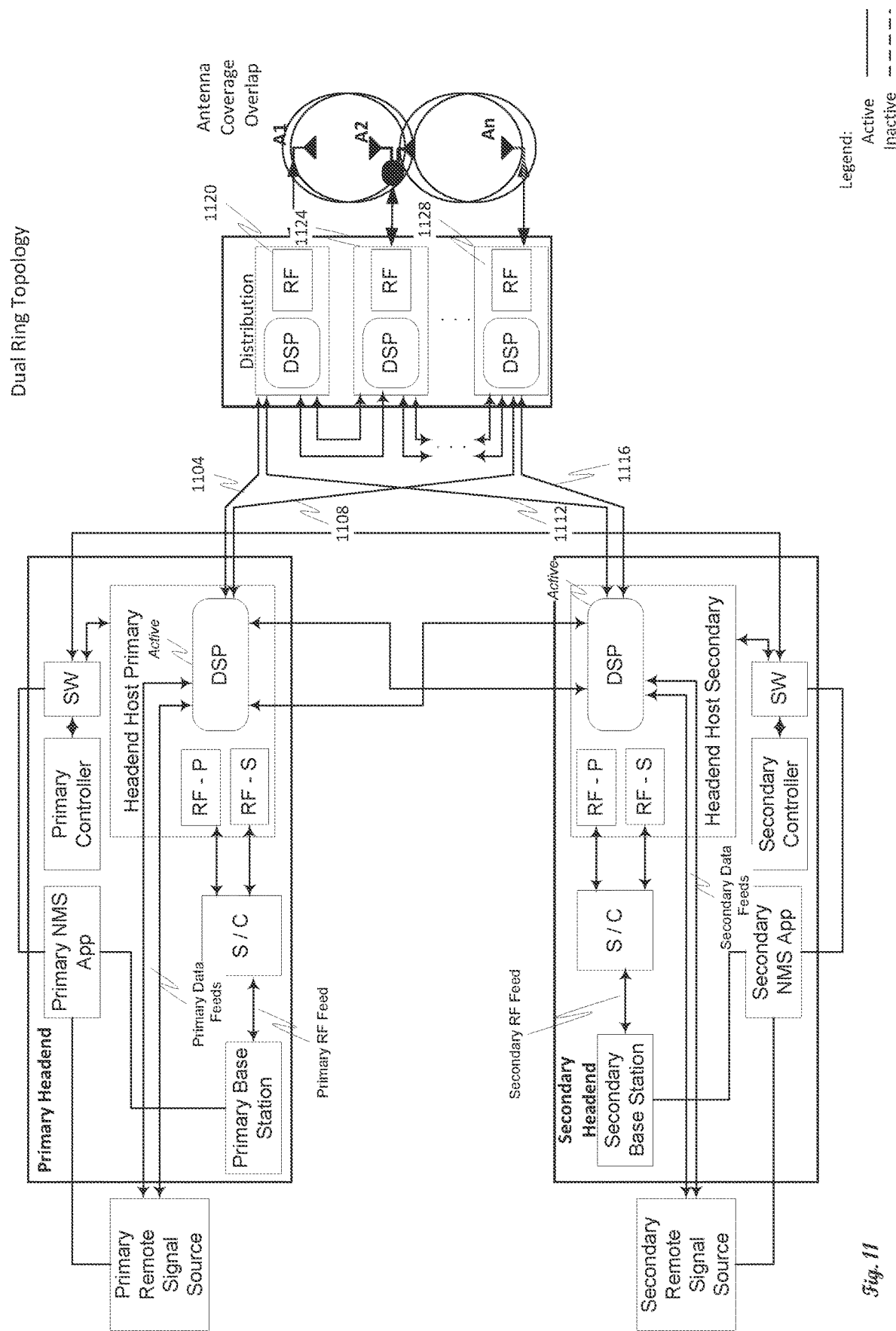
FIG. 11 illustrates an exemplary digital distribution system architecture dual ring topology according to an illustrative aspect.

FIG. 11 is a bock diagram illustrating another exemplary redundant Digital Distribution System in a normal operating state where primary headend is in an active state, and the secondary headend is also in an active state. The primary and secondary headends are the same as illustrated elsewhere herein, and thus the callouts have been omitted for clarity. The primary and secondary headends operate in a parallel mode (both headends are always active) and network of remote units (DRU's) that are connected to primary and secondary headends use a dual, fiber optic ring topology.

Each headend includes one (or more) hosts (DAUs), local base stations that are connected to the host at RF using coaxial cables, and one or more local or remote sources (base stations with the associated host or BBU/DU, or airHosts that pickup off-the-air signals) that are connected to the host over data optical links. The headend also includes a controller that provides management and control of the Digital Distribution System (DDS or digital DAS), and an NMS Application that provides management and control of the overall system that includes the DDS, the collocated base stations, and the other remote sources.

In a normal operating state both, the primary headend and secondary headend are active. Both, the primary and secondary hosts (DAUs) receive signals at multiple bands, in RF or a data format, and processes (RF to data conversion) and aggregate signals into single, high data rate, serial data stream. This data stream represents multiple Public Safety signals or/and cellular signals.

From the primary host the data stream is delivered to the first remote unit, that is cascaded to second remote unit, and to the next . . . . From the last remote in the daisy chain, the data stream is delivered back to the primary host, forming a primary signal distribution ring.

On a downlink (DL) path the data stream from the primary host is received by first remote unit, where is processed, translated from data to RF, and after amplification and filtering (by amplifier(s) and filter(s) (not shown)) delivered to the user UE (user equipment) via antenna and electromagnetic waves. Simultaneously, replica of the data stream received by the first remote is delivered to second remote, where the previously described process is repeated, and so on, up to the last remote in the chain.

On an uplink path (UL), the data stream that is created by processing RF signals received by the last remote (n) in the chain is delivered to the previous remote in the chain (n−1). That remote (n−1) sums the data stream received from the last remote with a data stream created in that remote by processing the RF signals received by that remote (n−1), and delivering aggregated content to next remote in the chain (n−2), where the previous described process is repeated, and so on, up to the first remote (1) in the chain. The data stream delivered from the first remote to the primary host contains UL signals of all the remotes in the chain.

To enable proper simulcast operation of the remotes in the ring, delay compensation can be applied at each remote to ensure that transmission of the DL signals at each remote, and reception of the UL signals at each remote, are synchronized and done at the same instance in time.

The data stream from the secondary host unit is also delivered to cascaded remotes forming a secondary signal distribution ring. Each remote has 4 optical data ports. Two used to establish connection for the primary distribution ring, and the other two to establish connections for the secondary distribution ring. To further increase resilience and redundancy of the system, each remote can be equipped with a dual optical by-pass switch, one for the primary and other for the secondary distribution ring.

In normal operation, remote units process data stream delivered over the primary distribution ring. In the case of primary host failure, the remotes automatically switch to the secondary signal distribution ring. In the case of remote failure, primary (and secondary), the by-pass switch decouples the failed remote and maintains data flow through the ring. In the case of a fiber cut between two remotes or between a remote and the host, the primary ring is transformed into the dual cascaded (daisy-chain) topology. In the case of a primary fiber cut at a second location, system transitions to utilizing the secondary distribution ring. In the case of a fiber cut in a secondary distribution ring, the secondary ring is transformed into the dual cascaded topology. In this way multiple failures can be handled by the system.

This exemplary configuration implements a dual ring topology directly between the headends and the distribution section that includes the DRUs. The remote units 1120-1128 are cascaded to each other, and fed from both ends (i.e., from link 1104 to DRU 1120 and from link 1108 to DRU 1128, with each DRU being interconnected with one or more active and/or inactive links, such as fiber cable). This configuration is mirrored from the secondary (active) host, forming a dual, primary and secondary, distribution ring, i.e., the primary ring comprises links 1104 and 1108 from the primary host and the corresponding links linking each DRU 1120-1128, and the active secondary link includes links 1112 and 1116 from the secondary host and the corresponding links linking each DRU 1120-1128.

Operation of the system in FIG. 11 is similar to that described with any failure being accounted for by switching to an active link/component.

For purposes of explanation, numerous details are set forth in order to provide a thorough understanding of the technology. It should be appreciated however that the techniques herein may be practiced in a variety of ways beyond the specific details set forth herein. Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices or collocated on a particular node/element(s) of a distributed network, such as a telecommunications network.

As will be appreciated from the following description, and for reasons of computational efficiency, the components of the system can be arranged at any location within a distributed network without affecting the operation of the system. Similarly, one or more functional portions of the system could be distributed between any of the elements and an associated computing device.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various methods, protocols and techniques according to the disclosure provided herein.

Exemplary aspects are directed toward:
A communications system comprising:
 a primary headend including:
  a primary host;
  a primary digital signal processor;
  a primary controller; and
  a primary base station;
 a secondary headend including:
  a secondary host;
  a secondary digital signal processor;
  a secondary controller; and
  a secondary base station;
 at least two links connecting the primary headend to the secondary headend;
 wherein the primary headend and the secondary headend are configured to be in an active, a standby or a partially active state based on telemetry data from one or more communications system components and the partially active headend contributes information to the active headend.

Any of the above aspects, further comprising a distribution section including a plurality of digital distribution units (DDUs) connected to one or more of the primary and secondary host.

Any of the above aspects, further comprising a plurality of Digital Remote Units (DRUs) connected to one or more of the DDUs, the primary host and/or the secondary host.

Any of the above aspects, wherein in the event of a failure, the controller activates a failover element for a failed element.

Any of the above aspects, further comprising a primary RF feed and a primary data feed for the primary host.

Any of the above aspects, further comprising a secondary RF feed and a secondary data feed for the secondary host.

Any of the above aspects, further comprising redundant links connecting the DDUs and DRUs.

Any of the above aspects, further comprising a primary and a secondary signal source, one or more switches, and one or more splitters/combiners.

Any of the above aspects, further comprising one or more overlapping antenna coverage areas associated with one or more Digital Remote Units (DRUs).

Any of the above aspects, further comprising a plurality of selectors in each digital signal processor and a plurality of ports.

Any of the above aspects, further comprising a distribution section including a plurality of primary digital distribution units (DDUs) connected to one or more of the primary and secondary host and a plurality of secondary digital distribution units (DDUs) connected to one or more of the primary and secondary host.

Any of the above aspects, further comprising redundant active links connecting the DDUs and DRUs and redundant active links connecting the DRUs.

Any of the above aspects, further comprising a plurality of Digital Remote Units (DRUs) connected to one or more of the primary host and the secondary host via one or more active and inactive links.

Any of the above aspects, wherein the DRUs are interconnected connected via one or more active and inactive links.

Any of the above aspects, further comprising a distribution section including a plurality of interconnected digital distribution units (DDUs) connected to one or more of the primary and secondary host.

Any of the above aspects, wherein the partially active headend contributes one or more of a RF signal and/or a data feed to the active headend.

Any of the above aspects, wherein the primary and the secondary headend are active.

Any of the above aspects, wherein the primary and the secondary host are active.

A method comprising:
 controlling, by a controller, a communications system that includes:
  a primary headend including:
   a primary host;
   a primary digital signal processor; and
   a primary base station;
  a secondary headend including:
   a secondary host;
   a secondary digital signal processor; and
   a secondary base station;
  at least two links connecting the primary headend to the secondary headend;
 by switching the primary headend and the secondary headend between an active, a standby or a partially active state based on telemetry data from one or more communications system components, wherein the partially active headend contributes information to the active headend.

Any of the above aspects, further comprising switching from a compromised link to a good link based on the telemetry data.

One or more means capable of performing any one or more of the functions described herein.

Any one or more of the aspects as substantially disclosed herein.

Any one or more of the aspects as substantially disclosed herein in combination with any one or more of the other aspects as substantially disclosed herein.

Any one or more of the aspects as substantially disclosed herein from any figure in combination with any one or more of the aspects as substantially disclosed herein from any other figure.

Examples of the processors (CPUs) as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The systems, methods and protocols illustrated herein can be implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for a redundant communications infrastructure. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A redundancy system for data transport in a Distributed Antenna System (DAS), the redundancy system comprising:
    a plurality of controllers, wherein each of the plurality of controllers is in communication with a plurality of Network Management systems (NMSs) being in communication with each of the plurality of DAUs using cross connection communication paths;
    a plurality of Digital Access Units (DAUs), wherein each of the plurality of DAUs is fed by a plurality of data streams and is operable to transport digital signals between others of the plurality of DAUs;
    a plurality of Digital Distribution Units (DDUs), each of the plurality of DDUs being in communication with each of the plurality of DAUs using cross connection communication paths; and
    a plurality of Digital Remote Units (DRUs), each of the plurality of DRUs being in communication with each of the plurality of DDUs using cross connection communications paths.

2. The system of claim 1, further comprising a distribution section including a plurality of digital distribution units (DDUs) connected to one or more of the primary and secondary host.

3. The system of claim 2, further comprising a plurality of Digital Remote Units (DRUs) connected to one or more of the DDUs, the primary host and/or the secondary host.

4. The system of claim 1, wherein in the event of a failure, the primary and secondary controller activates a failover element for a failed element.

5. The system of claim 1, further comprising a primary RF feed and a primary data feed for the primary host.

6. The system of claim 1, further comprising a secondary RF feed and a secondary data feed for the secondary host.

7. The system of claim 3, further comprising redundant links connecting the DDUs and DRUs.

8. The system of claim 1, further comprising a primary and a secondary signal source, one or more switches, and one or more splitters/combiners.

9. The system of claim 1, further comprising one or more overlapping antenna coverage areas associated with one or more Digital Remote Units (DRUs).

10. The system of claim 1, further comprising a plurality of selectors in each digital signal processor and a plurality of ports.

11. The system of claim 1, further comprising a distribution section including a plurality of primary digital distribution units (DDUs) connected to one or more of the primary and secondary host and a plurality of secondary digital distribution units (DDUs) connected to one or more of the primary and secondary host.

12. The system of claim 3, further comprising redundant active links connecting the DDUs and DRUs and redundant active links connecting the DRUs.

13. The system of claim 1, further comprising a plurality of Digital Remote Units (DRUs) connected to one or more of the primary host and the secondary host via one or more active and inactive links.

14. The system of claim 13, wherein the DRUs are interconnected via one or more active and inactive links.

15. The system of claim 1, further comprising a distribution section including a plurality of interconnected digital distribution units (DDUs) connected to one or more of the primary and secondary host.

* * * * *